No. 703,753. Patented July 1, 1902.
M. ARNDT.
INSTRUMENT FOR INDICATING THE PRESSURE OF GAS.
(Application filed Jan. 17, 1898.)
(No Model.)
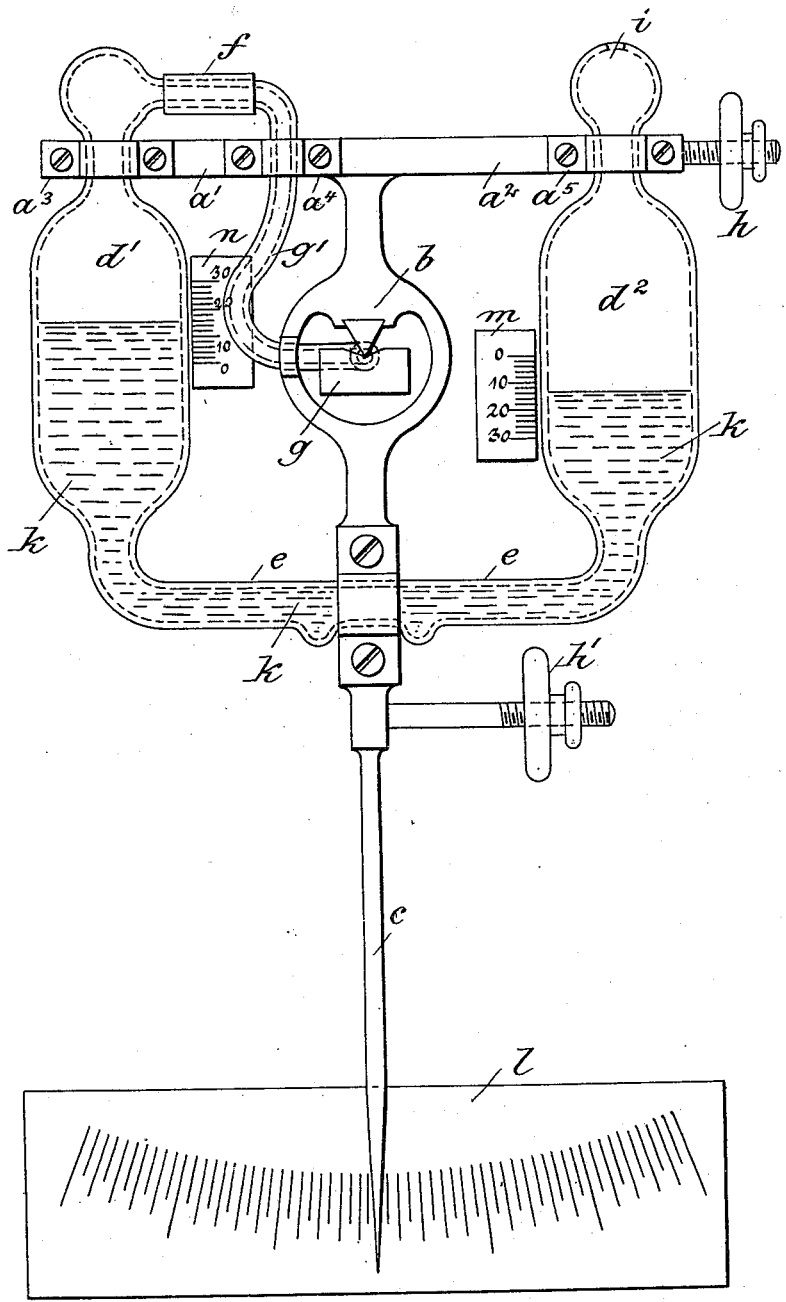

UNITED STATES PATENT OFFICE.

MAX ARNDT, OF AIX-LA-CHAPELLE, GERMANY.

INSTRUMENT FOR INDICATING THE PRESSURE OF GAS.

SPECIFICATION forming part of Letters Patent No. 703,753, dated July 1, 1902.

Application filed January 17, 1898. Serial No. 668,085. (No model.)

*To all whom it may concern:*

Be it known that I, MAX ARNDT, a subject of the King of Prussia, German Emperor, residing at the city of Aix-la-Chapelle, Germany, have invented a certain new and useful Improved Instrument for Indicating the Pressure of Gases, (for which I have made an application in Germany June 19, 1897, and in France September 7, 1897;) and I do hereby declare that the following is a full, clear, and exact description of the invention, which will enable others skilled in the art to which it appertains to make and use the same.

My invention relates to measuring instruments for indicating the pressure difference of gases with respect to the atmospheric pressure; and it essentially consists of a balance provided with a pair of communicating vessels to be filled with a locking liquid and exposed to the pressure of gas and the atmospheric pressure, respectively, the level variation of the liquid in the vessels resulting from the pressure difference being indicated by the corresponding stroke of the balance.

My invention is represented in the figure of the accompanying drawing in a side view.

A swinging T-shaped balance-frame $a'\ a^2$ is pivoted to a pan $g$ of the stationary framework (not represented in the drawing) by means of a blade $b$, carrying two vessels $d'\ d^2$, communicating with each other by a horizontal tube $e$ and fixed to the balance-frame by means of holders $a^3\ a^4\ a^5$. One of the vessels—say vessel $d'$—communicates by any convenient means with the chamber or receptacle containing the gas the pressure of which is to be measured with respect to the atmospheric pressure. The said communication is preferably effected, as shown in the drawing, by means of a hose or tube $g'$, air-tightly secured to a short pipe $f$, laterally projecting from vessel $d'$ and extending to the line of pivot-center of the swinging balance-frame, joining there with another pipe or hose air-tightly connected to the gas-containing chamber or receptacle. The other vessel $d^2$ is provided with an opening $i$ at the top, thus directly communicating with atmosphere. A pointer $c$ is fixed to the middle portion of the swinging balance-frame, playing on a scale $l$, provided to the standard or stationary framework of the apparatus. Similar scales $m\ n$ are fixed thereto in proximity of the vessels $d'\ d^2$, and adjustable weights $h\ h'$ are screwed to studs projecting from the swinging balance-frame.

The working of the apparatus is as follows: A liquid $k$ is poured in the vessels $d'\ d^2$, and weights $h\ h'$ are adjusted so as to bring the pointer to its initial position, (indicated by "0" on scale $l$,) the liquid-levels in both vessels being flush with each other. The gas-containing chamber or receptacle is then brought to communicate with vessel $d'$ by opening a valve or cock provided in the connecting-pipe. Thereby the pressure of the gas to be measured is transmitted to the interior of vessel $d'$, and if the said pressure differs from the atmospheric pressure maintained within the vessel $d^2$ the locking liquid $k$ will be accordingly displaced and the liquid-levels in vessels $d'$ and $d^2$ raised and lowered, respectively, or vice versa. By these means the center of gravity of the swinging balance-frame and of the parts supported by the same will likewise be displaced, so as to assume another position of equilibrium corresponding to the altered disposition of the masses. The pointer is accordingly brought to another point of scale $l$, thus indicating the level difference taking place in vessels $d'\ d^2$, which just corresponds to the pressure difference between the atmosphere and the gas to be compared therewith, and as the same difference is marked by and can be read from the scales $m\ n$ the latter assi.'t in controlling and stating the pointer-record.

My above-described device is applicable to many purposes—as, for instance, in measuring the draft in flues of boilers or the degree of rarefaction in gas-absorbing apparatuses and the like.

What I claim as my invention, and desire to secure by Letters Patent, is—

Apparatus such as described, comprising a scale-beam, knife-edge and support, a vessel open to the atmosphere held in one end of the scale-beam, a closed vessel held in the other end thereof, a rigid tube $e$ connecting the bottoms of the vessels, a flexible inlet-tube for gas leading from the support near the knife-edge to the upper end of the closed vessel, fixed scales proximate the liquid-levels in the vessels, whereby the reading on said scales will equal the difference between the elevation or depression of the liquid-level due to the swing of the apparatus and that due to the displacement of the liquid from one vessel to the other, and adjustable weights above and below the knife-edge to set the connected parts to a predetermined scale-point, and a pointer secured to the beam and arranged to travel over a suitable scale to indicate the amount of swing of the entire instrument, substantially as and for the purpose set forth.

In testimony whereof I sign this specification in the presence of two subscribing witnesses.

MAX ARNDT.

Witnesses:
SIBILLER MINETTE,
JOHN HERKMANNS.